United States Patent
Suzuki et al.

[11] Patent Number: 6,136,973
[45] Date of Patent: Oct. 24, 2000

[54] MELAMINE-MELAM-MELEM SALT OF A POLYPHOSPHORIC ACID AND PROCESS FOR ITS PRODUCTION

[75] Inventors: Keitaro Suzuki, Chiba; Masuo Shindo, Toyama; Motoko Iijima, Chiba, all of Japan

[73] Assignee: Nissan Chemical Industries, Ltd., Tokyo, Japan

[21] Appl. No.: 09/380,526

[22] PCT Filed: Feb. 26, 1998

[86] PCT No.: PCT/JP98/00777

§ 371 Date: Sep. 2, 1999

§ 102(e) Date: Sep. 2, 1999

[87] PCT Pub. No.: WO98/39306

PCT Pub. Date: Sep. 11, 1998

[30] Foreign Application Priority Data

Mar. 4, 1997 [JP] Japan .................................. 9-049211

[51] Int. Cl.⁷ .................................................. C07D 251/66
[52] U.S. Cl. .............................................................. 544/195
[58] Field of Search .............................................. 544/195

[56] References Cited

FOREIGN PATENT DOCUMENTS

WO 96/09344   3/1996   WIPO .
WO 96/17013   6/1996   WIPO .
WO 97/31056   8/1997   WIPO .

OTHER PUBLICATIONS

Hirotsu et al. JP 61 126091, Jun. 13, 1986. An English Abstract provided, 1986.
Ameican Chemical Society symposium 425, pp. 211–238, 1990, 1986.

Primary Examiner—Mukund J. Shah
Assistant Examiner—Venkataraman Balasubramanian
Attorney, Agent, or Firm—Oblon, Spivak, McClelland, Maier & Neustadt, P.C.

[57] ABSTRACT

A melamine.melam.melem salt of a polyphosphoric acid, which has a solubility of from 0.01 to 0.10 g/100 ml in water (25° C.), a pH of from 4.0 to 7.0 as a 10 wt % aqueous slurry (25° C.), and a melamine content of from 0.05 to 1.00 mol, a melam content of from 0.30 to 0.60 mol and a melem content of from 0.05 to 0.80 mol, per mol of the phosphorous atom; and A process for producing the above mentioned melamine-.melam.melem salt of a polyphosphoric acid, which comprises the following steps (a) and (b):

(a) a step of obtaining a reaction product by mixing melamine and phosphoric acid at a temperature of from 0 to 330° C. in such a ratio that the melamine is from 2.0 to 4.0 mols per mol of the phosphoric acid (as calculated as orthophosphoric acid content), and (b) a step of baking the reaction product obtained in step (a) at a temperature of from 340 to 450° C. for from 0.1 to 30 hours.

14 Claims, 2 Drawing Sheets

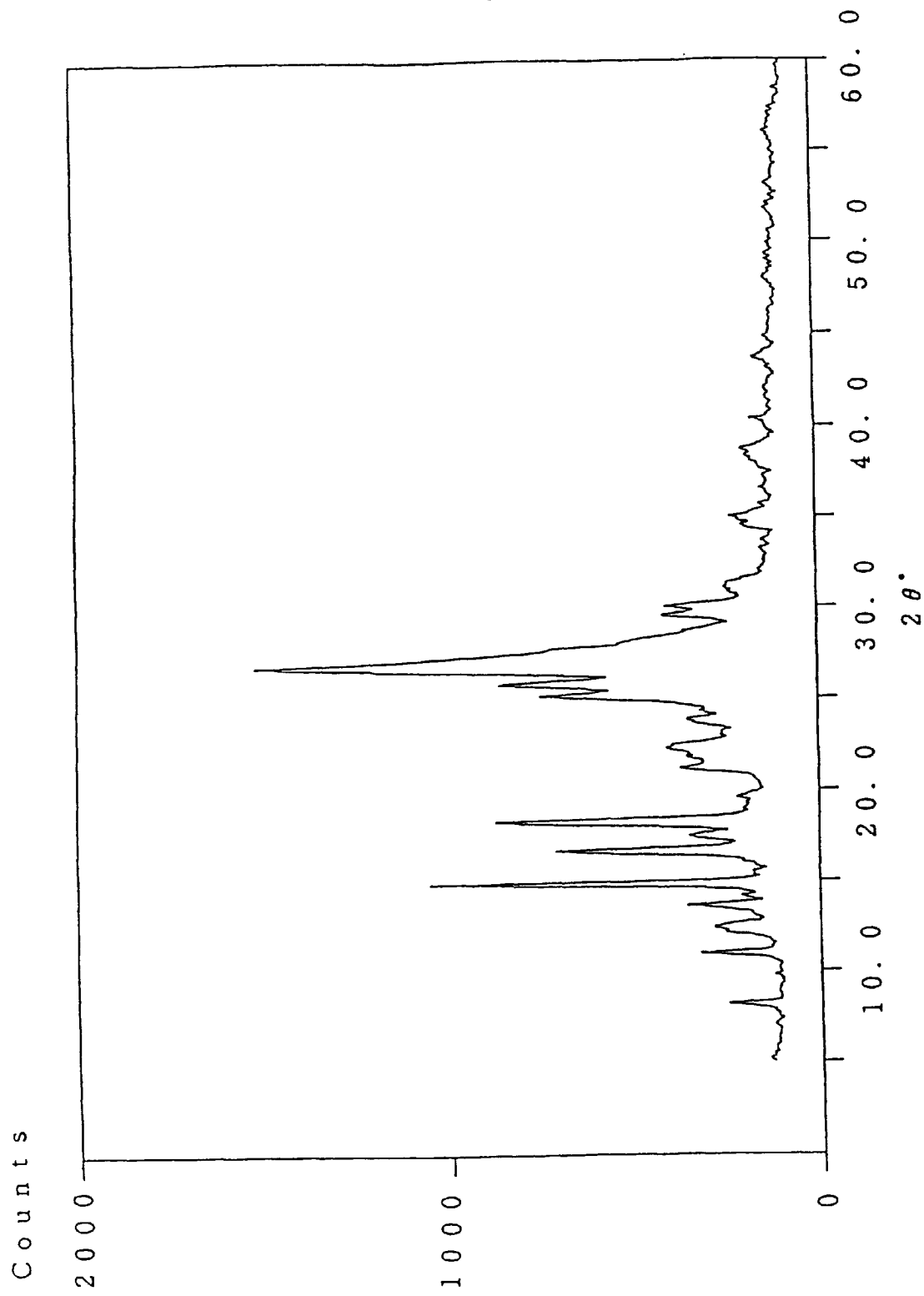
F I G. 2

MELAMINE-MELAM-MELEM SALT OF A POLYPHOSPHORIC ACID AND PROCESS FOR ITS PRODUCTION

TECHNICAL FIELD

The present invention relates to a melamine.melam.melem double salt of a polyphosphoric acid and a process for its production. The present invention further relates to a melamine.melam.melem double salt of a polyphosphoric acid having a small melamine content and a high melem content, and a process for its production.

BACKGROUND ART

With respect to baked products of melamine and phosphoric acid, melamine orthophosphate, melamine pyrophosphate and melamine polyphosphate have, for example, been known, and there have been many reports on processes for their production. For example, JP-B-40-28594 discloses a process for producing baked melamine phosphate having part of melamine orthophosphate remained, which comprises baking melamine orthophosphate at a temperature of from 180 to 250° C. However, it has been pointed out that the melamine phosphate is a complex of melamine orthophosphate and melamine pyrophosphate, and has no adequate water resistance.

U.S. Pat. No. 3,920,796 discloses a formation of melamine pyrophosphate by baking melamine orthophosphate at a temperature of from 170 to 325° C.

Further, U.S. Pat. No. 4,950,757 discloses a process for producing melamine pyrophosphate by reacting pyrophosphoric acid with melamine in an aqueous medium at a temperature of from 0 to 60° C.

JP-A-61-126091 discloses a process for producing melamine condensed phosphate which comprises reacting condensed phosphoric acid and melamine in a solid phase substantially in the absence of an aqueous medium under a temperature condition of from naturally generated heat temperature to 170° C.

It is known to employ urea as a condensation agent in the production of a polyphosphate. For example, JP-B-53-2170 discloses a process for producing a polyphosphoric acid amide (amide polyphosphate) containing amide-type nitrogen, which is obtainable by using ammonium orthophosphate, orthophosphoric acid, condensed phosphoric acid, phosphoric anhydride, urea phosphate, or a mixture thereof, as a phosphoric acid source, and a cyanamide compound such as melamine, dicyan cyanamide, guanidine or guanyl urea, as a nitrogen source, and subjecting a mixture thereof to a heat condensation reaction in the presence of urea, urea phosphate or a mixture thereof, as a condensation agent. As the production conditions, it is disclosed to carry out the heat condensation in a ratio of urea/phosphoric acid (as $H_3PO_4$)/cyanamide compound= 0.8–1.5/1/0.05–1 (molar ratio) in an ammonia gas atmosphere at a temperature of from 150 to 350° C. for from 10 minutes to 5 hours, preferably from 1 to 4 hours.

A.C.S. Symposium Series No. 425 "Fire and Polymers", chapter 15, p. 211–238, American Chemical Society, Washington, D.C., 1990, discloses that melam ultraphosphate is formed by heating melamine phosphate [melamine/phosphorus atom=1/1 (molar ratio)] at a temperature of from 330 to 410° C.

Many proposals have been made up to present with respect to utilization of melamine phosphate as a flame retardant. For example, JP-A-53-49054 discloses a polyamide resin composition having the flame retardancy improved by adding an inorganic filler and melamine phosphate to a polyamide.

JP-A-61-126091 discloses that melamine condensed phosphate is effective as a flame retardant for a thermoplastic resin such as a polyester, a polyamide or a polyolefin, a thermosetting resin such as phenol or urethane epoxy, or a cellulose material.

The melamine polyphosphate or the melamine condensed phosphate as disclosed in the above-mentioned prior art can hardly be used effectively as a flame retardant for a resin having a high molding temperature, since desorption of melamine is substantial when heated at a temperature of at least 300° C.

The present invention is to overcome the drawbacks of the above-mentioned prior art and to present a melamine.melam.melem double salt of a polyphosphoric acid, which is useful for a wide range of applications as a flame retardant and which is produced from melamine and phosphoric acid as starting materials, and a process for its production.

DISCLOSURE OF THE INVENTION

The process for producing a melamine.melam.melem double salt of a polyphosphoric acid, according to the present invention, will be described.

The process for producing a melamine.melam.melem double salt of a polyphosphoric acid which has a solubility of from 0.01 to 0.10 g/100 ml in water (25° C.), a pH of from 4.0 to 7.0 as a 10 wt % aqueous slurry (25° C.), and a melamine content of from 0.05 to 1.00 mol, a melam content of from 0.30 to 0.60 mol and a melem content of from 0.05 to 0.80 mol, per mol of the phosphorous atom, comprises the following steps (a) and (b):

(a) a step of obtaining a reaction product by mixing melamine and phosphoric acid at a temperature of from 0 to 330° C. in such a ratio that the melamine is from 2.0 to 4.0 mols per mol of the phosphoric acid (as calculated as orthophosphoric acid content), and (b) a step of baking the reaction product obtained in step (a) at a temperature of from 340 to 450° C. for from 0.1 to 30 hours.

Further, the process for producing a melamine.melam.melem double salt of a polyphosphoric acid having a low melamine content and a high melem content, according to the present invention, will be described.

The process for producing a melamine.melam.melem double salt of a polyphosphoric acid which has a solubility of from 0.01 to 0.10 g/100 ml in water (25° C.), a pH of from 4.0 to 7.0 as a 10 wt % aqueous slurry (25° C.), and a melamine content of from 0.05 to 0.40 mol, a melam content of from 0.30 to 0.60 mol and a melem content of from 0.30 to 0.80 mol, per mol of the phosphorous atom, comprises the following steps (a) and (b):

(a) a step of obtaining a reaction product by mixing melamine and phosphoric acid at a temperature of from 0 to 330° C. in such a ratio that the melamine is from 2.0 to 4.0 mols per mol of the phosphoric acid (as calculated as orthophosphoric acid content), and (b) a step of baking the reaction product obtained in step (a) at a temperature of from 340 to 450° C. for from 0.1 to 30 hours, while returning a sublimate of the melamine to the system, and discharging the formed ammonia out of the system.

And, in step (a) of the present invention, the phosphoric acid is preferably an aqueous orthophosphoric acid solution having an orthophosphoric acid concentration of at least 50 wt %.

Next, the melamine.melam.melem double salt of a polyphosphoric acid of the present invention is a melamine.melam.melem double salt of a chain polyphosphoric acid or a melamine.melam.melem double salt of metaphosphoric acid, of the general formula (1):

$$\alpha(MmH)_2O \cdot \beta(MdH)_2O \cdot \gamma(MpH)_2O \cdot \delta P_2O_5 \quad (1)$$

(wherein Mm represents melamine, Md represents melam, Mp represents melem, H represents a hydrogen atom, P represents a phosphorus atom, O represents an oxygen atom, and α, β, γ and δ represent positive numbers, having an interrelation of $1 \leq (\alpha+\beta+\gamma)/\delta < 2$).

The melamine (Mm) is 2,4,6-triamino-1,3,5-triazine of the formula (2):

$$C_3H_6N_6 \quad (2).$$

The melam (Md) is (N-4,6-diamino-1,3,5-triazin-2-yl)-1,3,5-triazine-2,4,6-triamine of the formula (3):

$$C_6H_9N_{11} \quad (3).$$

This is a 1,3,5-triazine derivative having two molecules of melamine condensed to have one molecule of ammonia desorbed therefrom.

The melem (Mp) is 2,5,8-triamino-1,3,4,6,7,9,9b-heptaazaphenalene of the formula (4):

$$C_6H_6N_{10} \quad (4).$$

This is a 1,3,5-triazine derivative having two molecules of melamine condensed to have two molecules of ammonia desorbed therefrom.

BRIEF DESCRIPTION OF THE DRAWINGS

FIG. 2 is a powder X-ray diffraction pattern of the melamine.melam.melem double salt of a polyphosphoric acid obtained in Example 1.

In FIG. 1, symbol 1 indicates a curve showing the results of the differential thermal analysis (DTA), symbol 2 indicates a curve showing the results of the thermogravimetric analysis (TG), and symbol 3 indicates a curve showing the results of the time (minutes) and the temperature (° C.).

BEST MODE FOR CARRYING OUT THE INVENTION

Figure 1:
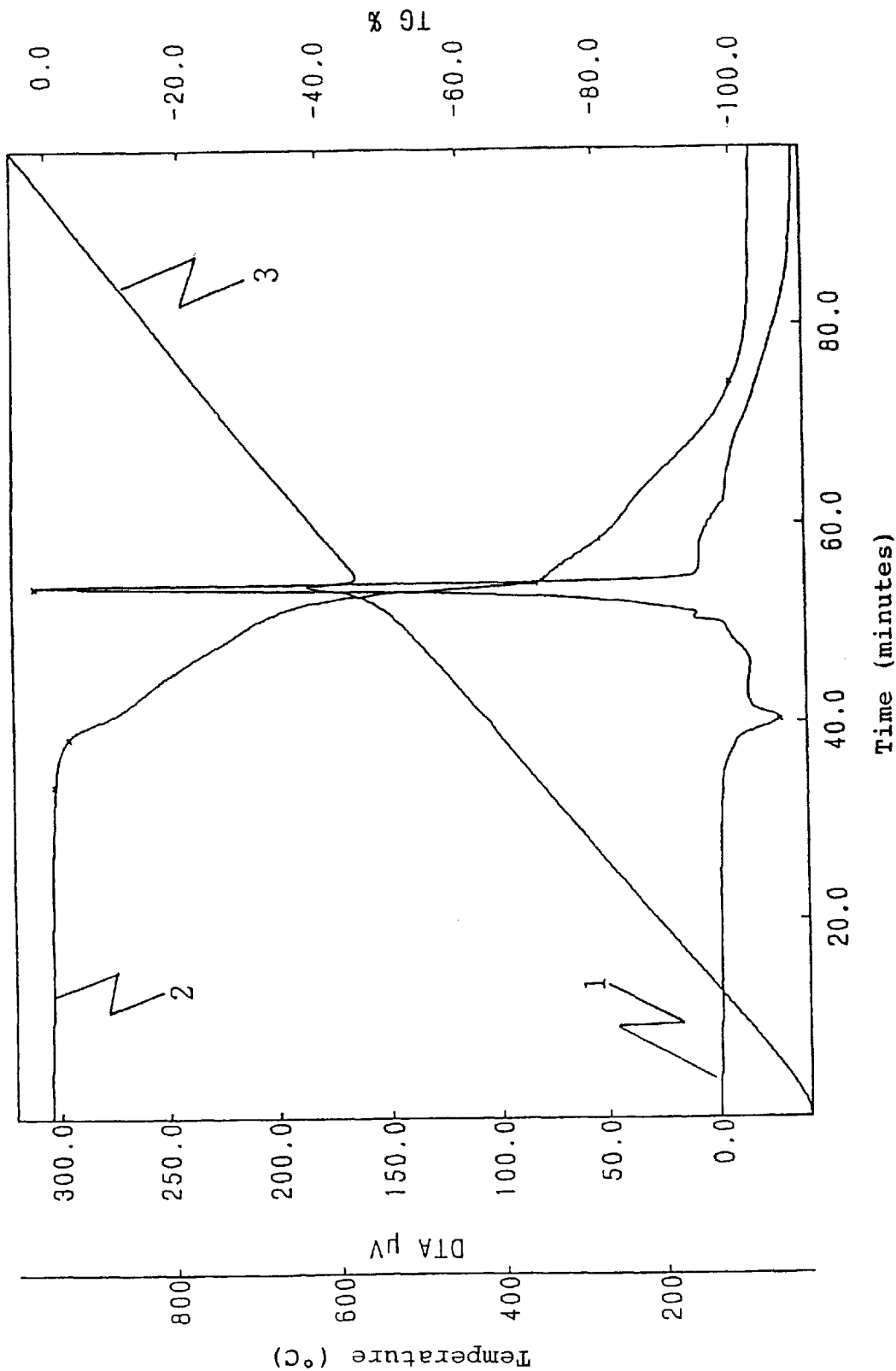
FIG. 1 is a graph of the differential thermal analysis of the melamine.melam.melem double salt of a polyphosphoric acid obtained in Example 1.

The melamine, the phosphoric acid, etc., to be used in step (a) of the present invention may be those which are commercially available.

As the phosphoric acid, orthophosphoric acid, pyrophosphoric acid or polyphosphoric acid may, for example, be used, but orthophosphoric acid is preferred. For an aqueous orthophosphoric acid solution, one made by either a thermal process or a wet process may be used as a solution having an orthophosphoric acid concentration of at least 50 wt %. However, the higher the orthophosphoric acid concentration, the better, and particularly preferred is a thermal process orthophosphoric acid aqueous solution having an orthophosphoric acid concentration of from 75 to 89 wt %. An aqueous orthophosphoric acid solution having an orthophosphoric acid concentration of less than 50 wt % is not desirable, since water is so much that, after mixing for reaction, it takes time for drying.

Further, in the present invention, instead of the phosphoric acid, an aqueous solution of ammonium monohydrogen phosphate may be employed, and an aqueous solution having ammonium phosphate added to an aqueous phosphoric acid solution, may also be employed.

In the present invention, for mixing melamine with phosphoric acid and sulfuric acid for reaction, it is possible to employ a mixing or stirring apparatus such as an automatic mortar, a universal mixer, a Henschel mixer or a homogenizer.

Remarkable heat generation takes place by the mixing of melamine with phosphoric acid according to the present invention. Accordingly, in a case where the concentrations of phosphoric acid and sulfuric acid used, are high, the reaction product will be obtained in the form of a wet or dry powder due to evaporation of water during the mixing. To carry out the reaction uniformly, the mixing or stirring apparatus is preferably a Henschel mixer having a shearing force.

In the present invention, melamine and phosphoric acid are mixed in such a ratio that the melamine is from 2.0 to 4.0 mols per mol of the phosphoric acid (as calculated as orthophosphoric acid content).

At the time of mixing melamine with phosphoric acid, if the ratio of the melamine is less than 2.0 mols per mol of the phosphoric acid (as calculated as orthophosphoric acid content), the acid in the baked product tends to be excessive, and the acidity tends to be too strong, such being undesirable. On the other hand, if the ratio of the melamine exceeds 4.0 mols per mol of the phosphoric acid, the amount of melamine remaining in the final baked product tends to be too much, or volatilization of melamine during the baking tends to be too much, such being undesirable.

In the present invention, the temperature for mixing and stirring the melamine with the phosphoric acid may be from 0 to 330° C., but it is preferably from 80 to 150° C. in order to efficiently carry out removal of water or to suppress volatilization of the melamine. The total time for mixing and stirring may usually be from 10 minutes to 2 hours, although it may depend also on the intensity of mixing.

By the mixing of melamine with phosphoric acid according to the present invention, the melamine is reacted with phosphoric acid to form a hydrous melamine phosphate. For the purpose of further improving water vapor resistance of the melamine.melam.melem double salt of a polyphosphoric acid, to increase the polymerization degree of the polyphosphoric acid, urea, as a condensing agent, may be added to the hydrous melamine phosphate.

In the mixing of melamine with phosphoric acid according to the present invention, it has been surprisingly found that deposition of the reaction product on the apparatus is little.

In the present invention, if required, for the purpose of preventing deposition, a colloidal silica powder may be added at the time of the mixing.

As the colloidal silica powder, one having a primary particle size of at most 100 nm, such as precipitated silica powder or pyrogenic silica powder, is preferred. And, one having a primary particle size of from 8 to 50 nm is more preferred, since it is readily available.

In the present invention, the reaction product obtained by mixing melamine with phosphoric acid, is baked at a temperature of from 340 to 450° C., preferably from 340 to 430° C., for from 0.1 to 30 hours, to obtain the desired baked product.

In step (b) in the present invention, the reaction product is dehydrated to be anhydrous, and at the same time, the melamine in the form of a phosphate becomes to be a melamine.melam.melem composite as a result of desorption of an ammonia molecule from a part of the melamine. And, the phosphoric acid will undergo condensation to form a melamine.melam.melem double salt of a polyphosphoric acid as the baked product.

In a ratio of the melamine being at most 1.0 mol per mol of the phosphoric acid (as calculated as orthophosphoric acid content), melamine polyphosphate or ultramelamine phosphate is formed in the baked product obtained in step (b), as shown in Comparative Example 1, and the melamine-.melam.melem double salt of a polyphosphoric acid desired in the present invention, can not be obtained.

This is different from the description in A.C.S. Symposium Series No. 425 "Fire and Polymers", chapter 15, p. 211–238, American Chemical Society, Washington, D.C., 1990, that ultramelam phosphate is formed by heating melamine phosphate [melamine/phosphorous atom=1/1 (molar ratio)] at a temperature of from 330 to 410° C.

With respect to the melamine.melam.melem double salts of polyphosphoric acids, the detailed structures are not clearly understood, but as a result of the differential thermal analysis, each compound is clearly different from the thermal decomposition behavior of a melamine salt such as melamine polyphosphate. It is considered that by the heating, a melamine.melam.melem double salt has been formed from the melamine salt.

If the baking temperature is less than 340° C., formation of a melamine.melam.melem double salt tends to be inadequate, whereby the desired baked product can hardly be obtainable. If it exceeds 450° C., the decomposition rate of the melamine.melam.melem double salt of a polyphosphoric acid tends to be higher than the formation rate, thus leading to formation of ammonia and volatilization of melamine, melam and melem, such being undesirable. Further, the content of the phosphoric acid in the formed product will increase, thus making the formed product acidic, such being undesirable.

In the present invention, if the baking time is less than 0.1 hour, formation of the desired baked product tends to be inadequate, and it may be longer than 30 hours, but if it exceeds 30 hours, such is not economical.

For the baking of the present invention, a hot air dryer, a rotary kiln, a double-shaft type continuous kiln, a fluidized-bed kiln, etc., may be employed alone or in combination. By selectively removing ammonia formed by the condensation of melamine, while controlling the efflux of melamine due to sublimation during the baking to a certain extent, melamine will effectively be formed into melam or melem. Accordingly, the baking by a lidded porcelain or alumina pot is preferred. Further, a baking kiln of a type capable of stirring during the baking, is more preferred, for uniform baking. Particularly, more preferred is a rotary kiln or a fluidized-bed kiln, capable of controlling the atmosphere, as baking can be carried out, while returning a sublimate of the melamine to the system, and discharging the formed ammonia out of the system. Further, baking can be carried out by an autoclave capable of controlling the pressure.

The baked product of the present invention may be pulverized and classified, as the case requires, by a dry system pulverizer such as a mixer, a pin disk mill, a ball mill or a jet-o-mizer, or a dry system pulverization classifier such as a counter jet mill or an ionomizer, to obtain a fine powder having an average particle size (a median diameter) of at most 20 μm, which is preferred for an application as a flame retardant, more preferably an average particle size (a median diameter) of at most 10 μm.

Further, as a flame retardant, a pulverized product of the above baked product may be used, and a pulverized product adjusted by adding at most 25 wt % of an inorganic substance such as a silica powder or an inorganic basic. substance, per 100 parts by weight of the baked product of the present invention, may also be used. The addition may be carried out from room temperature to 450° C. Namely, the addition may be carried out before the completion of the above baking, or the addition may be made to one cooled after completion of the baking. For such an addition, it is preferred to employ a mixing apparatus having a shearing force such as a Henschel mixer, a homogenizer or a homomixer, but a method of mixing by a V-type mixer or a universal mixer, followed by pulverization by a pulverizer such as a pin disk mill, a jet-o-mizer, a ball mill, a counter jet mill or an ionomizer, may also be employed. Also in such a case, by the pulverization, it is possible to obtain a fine powder having an average particle size of at most 20 μm, preferably an average particle size of at most 10 μm. Further, after mixing at room temperature, rebaking may be carried out at a temperature of from 340 to 450° C.

Here, the above-mentioned inorganic substance is a substance insoluble in water or having a low solubility. For example, magnesium hydroxide, aluminum hydroxide, calcium hydroxide, calcium silicate, magnesium silicate, calcium carbonate, silica powder, talc or zinc oxide may, for example, be mentioned as a preferred example. As such an inorganic substance, a commercially available one may be employed.

The flame retardant comprising the above-mentioned inorganic substance and the baked product of the present invention, may be made to have a solubility of from 0.01 to 0.10 g/100 ml in water (25° C.) and a pH of from 4.0 to 8.0 as a 10 wt % aqueous slurry (25° C.).

In the present invention, methods for evaluation of samples are as follows. Here, as samples, the products pulverized by a pin disk mill were employed.
(1) Elemental Analysis
   (i) Carbon, nitrogen and hydrogen
   Measured by means of an apparatus for elemental analysis 2400 CHN elemental analyzer (Perkin-Elmer Corp.)
   (ii) Phosphorus
   Measured by a phosphorus vanadomolybdate absorptiometry
(2) Differential Thermal Analysis
   Measured by means of an apparatus for differential thermal analysis TG/DTA320U (manufactured by Seiko Instruments & Electronics, Ltd.).
   (Measuring conditions)
   Sample 11 mg, reference: α-alumina 11 mg,
   Measuring temperature range: 25–1000° C. or 25–710° C.,
   Temperature raising rate: 10° C./min
(3) Powder X-ray Diffraction
   Measured by means of an apparatus for X-ray diffraction JEOL JDX-8200T (manufactured by JEOL Ltd.) (Anticathode: Cu-Kα)
(4) Bulk Specific Gravity (loose apparent density)
   Measured by means of a powder tester (manufactured by Hosokawa Micron Corp.)
(5) Average Particle Size
   The 50% volume diameter (median diameter) was taken as the average particle size.

The 50% volume diameter (median diameter) was measured by means of a centrifugal sedimentation particle measuring apparatus SA-CP3 (manufactured by Shimadzu Corporation).

(Measuring conditions) Solvent: pure water (25° C.)

(6) pH of a 10 wt % Aqueous Slurry (25° C.)

Into a 300 ml beaker, 25 g of a sample was taken, and then, 225 ml (25° C.) of pure water measured by a measuring cylinder, was added thereto. Then, a magnetic stirring element was put into the beaker, followed by stirring by a magnetic stirrer for 30 minutes to obtain a 10 wt % aqueous slurry.

Then, the above 10 wt % aqueous slurry was measured by means of a pH meter M-8AD (manufactured by Horiba, Ltd.).

(7) Solubility (30 minutes) in Water (25° C.)

Into a 300 ml beaker, 5.00 g ($a$ g) of a sample was accurately weighed, and then, 250 ml (25° C.) of pure water measured by a measuring cylinder, was added thereto. Then, under a constant temperature (25° C.), a magnetic stirring element was put into the beaker, followed by stirring by a magnetic stirrer for 30 minutes to obtain a slurry. The obtained slurry was suction-filtered through a No. 5A filter paper which was preliminarily dried and had its weight accurately weighed. At that time, after once the filtration was completed, the filtrate was taken into a separate container, and with that filtrate, the slurry remaining in the beaker used for the preparation of the slurry, was washed and put onto the No. 5A filter paper which was used for the previous filtration and on which the undissolved sample was attached. Thus, the undissolved sample was recovered substantially in the entire amount on the No. 5A filter paper.

Then, into a Petri dish having its weight accurately weighed, the No. 5A filter paper having the undissolved sample recovered thereon, was put, and the Petri dish was put into a hot air dryer preliminarily heated to 80° C. and dried for 5 hours. Thereafter, the Petri dish was immediately put into a desiccator and left to cool.

After cooling, the total weight was measured, and the weights of the No. 5A filter paper and the Petri dish were subtracted from the total weight to obtain the amount of the undissolved sample ($b$ g).

The solubility (g/100 ml) was obtained by a calculation formula of $100 \cdot (a-b)/250$.

(8) Solubility (24 Hours) in Water (25° C.)

Into a 300 ml beaker, 5.00 g ($a$ g) of the sample was accurately weighed, and then, 250 ml (25° C.) of pure water measured by a measuring cylinder, was added thereto. Then, under a constant temperature (25° C.), a magnetic stirring element was put into the beaker, followed by stirring by a magnetic stirrer for 24 hours to obtain a slurry. After the preparation of this slurry, the solubility (g/100 ml) was obtained in the same manner as for the solubility (30 minutes) in water (25° C.).

(9) Solubility (36 Hours) in Water (25° C.)

Into a 300 ml beaker, 5.00 g ($a$ g) of a sample was accurately weighed, and then, 250 ml (25° C.) of pure water measured by a measuring cylinder was added thereto. Then, under a constant temperature (25° C.), a magnetic stirring element was put into the beaker, followed by stirring by a magnetic stirrer for 36 hours to obtain a slurry. After the preparation of this slurry, the solubility (g/100 ml) was obtained in the same manner as for the solubility (30 minutes) in water (25° C.)

(10) High Performance Liquid Chromatography

Melamine, melam, melem, etc., as base components in a sample, were measured by a high performance liquid chromatography apparatus, Hitachi L-400 (manufactured by Hitachi, Ltd.). As the column, a cation exchange resin type column was employed.

(Measuring conditions)

Column: PATISIL 10-SCX (250 mm×4.6 mm in diameter),

Carrier solvent: 0.05 M, pH 3.7, phosphate buffer solution,

Carrier flow rate: 1.5 ml/min,

Oven temperature: 40° C.,

Method for detection: UV detection method (230 nm),

Preparation of a Sample Solution for Measurement:

5 mg of a sample was dissolved under heating in 49 g of an aqueous orthophosphoric acid solution having an orthophosphoric acid concentration of 85 wt % and then diluted to 500 ml with pure water to obtain a sample solution for measurement.

EXAMPLE 1

Step (a)

Into a 5 l universal mixer (made of stainless steel), 831.6 g (6.6 mols) of melamine (manufactured by Nissan Chemical Industries, Ltd.) was taken, and 230.6 g (orthophosphoric acid content: 2.0 mols) of an aqueous orthophosphoric acid solution having an orthophosphoric acid concentration of 85 wt % (manufactured by TOSOH CORPORATION) was added and mixed for 10 minutes, with stirring. After completion of the addition, stirring was continued for further 30 minutes. The melamine was 3.3 mols per mol of the orthophosphoric acid content. By the addition of this aqueous orthophosphoric acid solution, remarkable heat generation took place, and steam was generated. The obtained wet powder-like reaction product was 1034.5 g.

Step (b)

500 g of the wet powder-like reaction product obtained in step (a) was put into a stainless steel vat, and baking was carried out at 370° C. in an electric furnace as baking of the first stage. The temperature raising time was such that the temperature became 370° C. in about 1 hour, and the baking temperature was maintained at 370° C. for 3 hours. Certain agglomeration takes place due to dehydration, and to prevent such agglomeration, when the temperature of the baked product became 370° C., it was taken out, and the agglomerated one was disintegrated, whereupon the baking was continued. By the baking, sublimation of melamine and formation of ammonia due to decomposition of melamine were observed. Further, as the second stage, the temperature was raised to 380° C. (temperature raising time: 15 minutes), and maintained at 380° C. for 3 hours. By the baking, sublimation of melamine and formation of ammonia due to decomposition of melamine were remarkably observed. As the baked product, 322.1 g was obtained.

This baked product was cooled, and then pulverization was carried out by a pin disk mill. The obtained pulverized product had powder characteristics such that the bulk specific gravity was 0.6 g/ml and the average particle size was 13 μm.

As a result of the high performance liquid chromatography with respect to this baked product, the base components comprised melamine, melam and melem as the main components. Melamine/melam/melem=2.29/1.00/0.66 (molar ratio).

As a result of the elemental analysis, carbon was 24.25 wt %, nitrogen was 51.78 wt %, hydrogen was 3.97 wt %, and phosphorus was 8.50 wt %. In the baked product, the ratio of the nitrogen atom was 1.84 mols per mol of the carbon atom, which agreed to the ratio of the nitrogen atom being 1.86 mols per mol of the carbon atom as calculated from the result of the high performance liquid chromatography.

Melamine/melam/melem/phosphorus atom=0.98/0.43/0.29/1.0 (molar ratio), as calculated from the molar ratio of melamine, melam and melem as the base components in the high performance liquid chromatography and the results of carbon and phosphorus in the elemental analysis.

As a result of a differential thermal analysis of this baked product, a rapid decomposition took place at 630° C., which was similar to the decomposition of a melam salt, a melem salt or the like. This is clearly different from the thermal decomposition behavior of melamine polyphosphate, and this baked product is considered to be a melamine.melam.melem double salt of a polyphosphoric acid.

As a result of powder X-ray diffraction of this baked product, the positions of peaks substantially agree with the peaks of melamine polyphosphate, but the peaks are broad and clearly not of melamine polyphosphate. This melamine.melam.melem double salt of a polyphosphoric acid showed characteristic X-ray diffraction peaks as shown in Table 1.

TABLE 1

Characteristic X-ray diffraction peaks of the melamine.melam.melem double salt of a polyphosphoric acid

| 2 θ (°) | (anticathode: Cu—Kα) Intensity ratio (I/I) |
|---|---|
| 8.2 | 16 |
| 14.8 | 70 |
| 18.3 | 58 |
| 26.7 | 100 |

This baked product had a pH of 6.72 as a 10 wt % aqueous slurry (25° C.). Further, the solubility (30 minutes) in water (25° C.) showed a very small value of 0.03 g/100 ml. Likewise, the solubility (24 hours) in water (25° C.) showed a very small value of 0.05 g/100 ml.

EXAMPLE 2

Step (a)

Into a 100 l Henschel mixer (made of stainless steel), 15.12 kg (120 mols) of melamine (manufactured by Nissan Chemical Industries, Ltd.) was taken, and 4612 g (orthophosphoric acid content: 40 mols) of an aqueous orthophosphoric acid solution having an orthophosphoric acid concentration of 85 wt % (manufactured by TOSOH CORPORATION), was added and mixed in 15 minutes with stirring. After completion of the addition, stirring was continued for further 30 minutes. The melamine was 3.0 mols per mol of the orthophosphoric acid content. By the addition of this aqueous orthophosphoric acid solution, remarkable heat generation took place, and steam was generated. The obtained wet powder-like reaction product was 19.14 kg.

Step (b)

19.14 kg of the wet powder-like reaction product obtained in step (a) was baked by a double-shaft type continuous kiln at 340° C. as baking of the first stage. The temperature raising time was such that the temperature became 340° C. in about 3 hours, and the baking temperature was maintained at 340° C. for 4 hours. By the baking, sublimation of melamine and formation of ammonia due to decomposition of melamine were observed. As an intermediate baked product, 15.3 kg was obtained.

Further, as the second stage, the temperature was raised to 380° C. (temperature raising time: 1 hour) by a cylindrical fluidized-bed kiln, and maintained at 380° C. for 1 hour to bake 3.0 kg of the intermediate baked product obtained in the baking of the first stage. By the baking, sublimation of melamine and formation of ammonia due to decomposition of melamine were remarkably observed. As a baked product, 2.7 kg was obtained.

This baked product was cooled, and then, pulverization was carried out by a pin disk mill. The obtained pulverized product had powder characteristics such that the bulk specific gravity was 0.6 g/ml and the average particle size was 13 μm.

As a result of the high performance liquid chromatography with respect to this baked product, the base components comprised melamine and melam as the main components, and melem was present as a minor component. Melamine/melam/melem=1.90/1.00/0.18 (molar ratio).

As a result of the elemental analysis, carbon was 21.77 wt %, nitrogen was 46.67 wt %, hydrogen was 5.86 wt % and phosphorus was 9.70 wt %. The ratio of the nitrogen atom was 1.84 mols per mol of the carbon atom in the baked product.

Melamine/melam/melem/phosphorus atom=0.84/0.44/0.08/1.0 (molar ratio), as calculated from the molar ratio of melamine, melam and melem as the base components in the high performance liquid chromatography and the results of carbon and phosphorus in the elemental analysis.

As a result of a differential thermal analysis of this baked product, a rapid decomposition took place at around 600° C., which was similar to the decomposition of a melam salt, a melem salt or the like. This is clearly different from the thermal decomposition behavior of melamine polyphosphate, and this baked product is considered to be a melamine.melam.melem double salt of a polyphosphoric acid.

As a result of powder X-ray diffraction of this baked product, the positions of peaks substantially agree with the peaks in Example 1.

This baked product had a pH of 4.18 as a 10 wt % aqueous slurry (25° C.). Further, the solubility (30 minutes) in water (25° C.) showed a very small value of 0.03 g/100 ml. Likewise, the solubility (24 hours) in water (25° C.) showed a very small value of 0.05 g/100 ml.

EXAMPLE 3

Step (b)

3.0 kg of the intermediate baked product obtained in the baking of the first stage in step (b) in Example 2, was baked in such a manner that by using a cylindrical fluidized-bed kiln, the temperature was raised to 390° C. (temperature raising time: 1 hour), and maintained at 390° C. for 1 hour, as baking of the second stage in stage (b). At the time of this baking, the holding temperature at the upper edge of the cylindrical fluidized-bed kiln was decreased so that a sublimate of melamine was deposited on the wall of the furnace, the sublimate of melamine attached on the wall was peeled off by baked fluidized particles, and the melamine was returned into the kiln, whereby the efflux of the melamine due to sublimation was controlled. Accordingly, certain sublimation of melamine and formation of ammonia due to decomposition of melamine were observed. As a baked product, 2.8 kg was obtained.

This baked product was cooled, and then pulverization was carried out by a pin disk mill. The obtained pulverized product had powder characteristics such that the bulk specific gravity was 0.6 g/ml, and the average particle size was 12 μm.

As a result of the high performance liquid chromatography with respect to the obtained baked product, the base components comprised melam and melem as the main components, and melamine was present as a minor component. Melamine/melam/melem=0.54/1.00/1.02 (molar ratio).

As a result of the elemental analysis, carbon was 22.36 wt %, nitrogen was 47.56 wt %, hydrogen was 3.11 wt %, and phosphorus was 11.2 wt %.
Melamine/melam/melem/phosphorus atom=0.21/0.38/0.39/1.0 (molar ratio), as calculated from the molar ratio of melamine, melam and melem as the base components in the high performance liquid chromatography and the results of carbon and phosphorus in the elemental analysis.

As a result of a differential thermal analysis of this baked product, a rapid decomposition took place at around 600° C., which was similar to the decomposition of a melam salt, a melem salt or the like. This is clearly different from the thermal decomposition behavior of melamine polyphosphate, and this baked product is considered to be a melamine.melam.melem double salt of a polyphosphoric acid.

As a result of powder X-ray diffraction of this baked product, the positions of peaks substantially agree with the peaks in Example 1.

This baked product had a pH of 4.72 as a 10 wt % aqueous slurry (25° C.). Further, the solubility (30 minutes) in water (25° C.) showed a very small value of 0.03 g/100 ml. Likewise, the solubility (24 hours) in water (25° C.) showed a very small value of 0.05 g/100 ml.

EXAMPLE 4

Step (a)

Into a 10 l Henschel mixer (made of stainless steel), 1260 g (10 mols) of melamine (manufactured by Nissan Chemical Industries, Ltd.) was taken, and 461.2 g (orthophosphoric acid content: 4.0 mols) of an aqueous orthophosphoric acid solution having an orthophosphoric acid concentration of 85 wt % (manufactured by TOSOH CORPORATION) was added and mixed in 10 minutes with stirring. After completion of the addition, stirring was continued for further 30 minutes. The melamine was 2.5 mols per mol of the orthophosphoric acid content. By the addition of the aqueous orthophosphoric acid solution, remarkable heat generation took place, and steam was generated. The obtained wet powder-like reaction product was 1670 g.

Step (b)

500 g of the wet powder-like reaction product obtained in step (a) was put into a lidded alumina pot, and baking was carried out at 390° C. in an electric furnace. The temperature raising time was such that the temperature became 390° C. in about 1 hour, and the temperature was maintained at 390° C. for 6 hours. By the baking, sublimation of melamine and formation of ammonia due to decomposition of melamine were observed. As the baked product, 335.6 g was obtained.

This baked product was cooled, and then pulverization was carried out by a pin disk mill. The obtained pulverized product had powder characteristics such that the bulk specific gravity was 0.6 g/ml and the average particle size was 13 μm.

As a result of the high performance liquid chromatography with respect to this baked product, the base components comprised melam and melem as the main components, and melamine was present as a minor component. Melamine/melam/melem=0.63/1.00/0.86 (molar ratio).

As a result of the elemental analysis, carbon was 24.97 wt %, nitrogen was 52.41 wt %, hydrogen was 3.29 wt %, and phosphorus was 8.70 wt %.

Melamine/melam/melem/phosphorus atom=0.37/0.57/0.48/1.0 (molar ratio), as calculated from the molar ratio of melamine, melam and melem as the base components in the high performance liquid chromatography and the results of carbon and phosphorus in the elemental analysis.

As a result of a differential thermal analysis of this baked product, a rapid decomposition took place at around 600° C., which was similar to the decomposition of a melam salt, a melem salt or the like. This is clearly different from the thermal decomposition behavior of melamine polyphosphate, and this baked product is considered to be a melamine.melam.melem double salt of a polyphosphoric acid.

As a result of powder X-ray diffraction of this baked product, the positions of peaks substantially agree with the peaks in Example 1.

This baked product had a pH of 6.76 as a 10 wt % aqueous slurry (25° C.). Further, the solubility (30 minutes) in water (25° C.) showed a very small value of 0.03 g/100 ml. Likewise, the solubility (24 hours) in water (25° C.) showed a very small value of 0.05 g/100 ml.

EXAMPLE 5

Step (b)

500 g of the wet powder-like reaction product obtained in step (a) in Example 4 was put into a lidded alumina pot, and baking was carried out in an electric furnace at 420° C. The temperature raising time was such that the temperature became 420° C. in about 1 hour, and the temperature was maintained at 420° C. for 6 hours. By the baking, sublimation of melamine and formation of ammonia due to decomposition of melamine were observed. As the baked product, 332.5 g was obtained.

This baked product was cooled, and then, pulverization was carried out by a pin disk mill. The obtained pulverized product had powder characteristics such that the bulk specific gravity was 0.6 g/ml and the average particle size was 12 μm.

As a result of the high performance liquid chromatography with respect to the baked product, the base components comprised melam and melem as the main components, and melamine was present as a minor component. Melamine/melam/melem=0.15/1.00/1.50 (molar ratio).

As a result of the elemental analysis, carbon was 24.64 wt %, nitrogen was 50.04 wt %, hydrogen was 2.70 wt %, and phosphorus was 8.80 wt %.

Melamine/melam/melem/phosphorus atom=0.07/0.47/0.70/1.0 (molar ratio), as calculated from the molar ratio of melamine, melam and melem as the base components in the high performance liquid chromatography and the results of carbon and phosphorus in the elemental analysis.

As a result of a differential thermal analysis of this baked product, a rapid decomposition took place at around 600° C., which was similar to the decomposition of a melam salt, a melem salt or the like. This is clearly different from the thermal decomposition behavior of melamine polyphosphate, and this baked product is considered to be a melamine.melam.melem double salt of a polyphosphoric acid.

As a result of powder X-ray diffraction of this baked product, the positions of peaks substantially agree with the peaks in Example 1.

This baked product had a pH of 5.32 as a 10 wt % aqueous slurry (25° C.). Further, the solubility (30 minutes) in water (25° C.) showed a very small value of 0.03 g/100 ml. Likewise, the solubility (24 hours) in water (25° C.) showed a very small value of 0.05 g/100 ml.

COMPARATIVE EXAMPLE 1

Step (a)

Into a 5 l universal mixer (made of stainless steel), 504 g (4.0 mols) of melamine (manufactured by Nissan Chemical Industries, Ltd.) was taken, and 461.2 g (orthophosphoric acid content: 4.0 mols) of an aqueous orthophosphoric acid solution having an orthophosphoric acid concentration of 85 wt % (manufactured by TOSOH CORPORATION) was added and mixed in 10 minutes with stirring. After completion of the addition, stirring was continued for further 30 minutes. The melamine was 1.0 mol per mol of the orthophosphoric acid content. By the addition of the aqueous orthophosphoric acid solution, remarkable heat generation took place, and steam was generated. The obtained wet powder-like reaction product was 945 g. The obtained wet powder-like reaction product was put into a stainless steel vat, and mixing was carried out under heating at 310° C. in an electric furnace. The temperature raising time was such that the temperature became 310° C. in about 1 hour, and the temperature was maintained at 310° C. for 4 hours. Certain agglomeration takes place due to dehydration, and to prevent such agglomeration, when the temperature became 310° C., the reaction product was taken out, and the agglomerated one was disintegrated, whereupon the heating was continued. 690 g of a powder-like reaction product was obtained.

Step (b)

500 g of the powder-like reaction product obtained in step (a) was put in a lidded alumina pot, and the temperature was raised to 380° C. (temperature raising time: 1 hour), and maintained at 380° C. for 4 hours. By the baking, sublimation of melamine and formation of ammonia due to decomposition of melamine were observed. As the baked product, 237 g was obtained.

This baked product was cooled, and then, pulverization was carried out by a pin disk mill. The obtained pulverized product had powder characteristics such that the bulk specific gravity was 0.60 g/ml and the average particle size was 14 $\mu$m.

As a result of the high performance liquid chromatography with respect to this baked product, the base component comprised melamine alone. As a result of the elemental analysis, carbon was 4.40 wt %, nitrogen was 10.11 wt %, hydrogen was 3.29 wt %, and phosphorus was 32.8 wt %. In the baked product, the ratio of the nitrogen atom was 2.0 mols per mol of the carbon atom, which apparently agreed substantially to the ratio (theoretical value) of the nitrogen atom in melamine.

The result of the differential thermal analysis of this baked product agreed with the thermal decomposition behavior of melamine polyphosphate. This baked product had an excessive phosphoric acid content due to thermal decomposition of melamine, and accordingly, it had a low pH of 1.56 as a 10 wt % aqueous slurry (25° C.).

IDUSTRIAL APPLICABILITY

The baked products obtained by the present invention were confirmed to be a melamine.melam.melem double salts of polyphosphoric acids by the elemental analyses, the powder X-ray diffraction and the differential thermal analyses.

The melamine.melam.melem double salts of polyphosphoric acids of the present invention, are excellent in heat resistance and water resistance and also excellent in the powder characteristics such as pulverizability, dispersibility and flowability. Further, such melamine.melam.melem double salts of polyphosphoric acids have high melamine, melam and melem decomposition temperatures, and the temperature for desorbing (volatilization) of phosphoric acid are lower than melamine polyphosphate. Accordingly, the baked products of the present invention will show very high flame retardancy when used alone or in combination with other phosphorus-type flame retardants.

Melamine.melam.melem double salts of polyphosphoric acids, according to the present invention, are useful as flame retardants for a wide range of resins including thermosetting resins such as phenol resins, epoxy resins, polyurethanes and unsaturated polyesters, thermoplastic resins such as polyamides, aromatic polyamides, polyethylene oxides, polycarbonates, polyolefins (such as polyethylene, polypropylene and polystyrene), polyphenylene ethers, modified polyphenylene ethers, rubber-modified styrene acrylonitrile-butadiene-styrene (ABS), polyesters, polysulfones, polybutylene terephthalates and polyvinyl chlorides, and their copolymers and alloys. Further, they are useful as flame retardants for e.g. molded products of these resins, resin-containing coating materials or adhesives, fibers and fiber products.

The melamine.melam.melem double salts of polyphosphoric acids, according to the present invention, can be used in combination with those which are commonly used for the production of plastic materials, such as reinforcing agents, heat stabilizers, photo stabilizers, antioxidants, antistatic agents, pigments, fillers, lubricants, plasticizers or coupling agents for glass fibers, carbon fibers or potassium titanate whiskers. Further, the baked products of the present invention can be used in combination with other phosphorus type flame retardants, bromine type flame retardants or inorganic type flame retardants such as aluminum hydroxide or magnesium hydroxide.

Further, the melamine.melam.melem double salts of polyphosphoric acids, according to the present invention, can be used also as resin stabilizers in addition to flame retardants.

What is claimed is:

1. A melamine melam melem salt of a polyphosphoric acid of the formula (1):

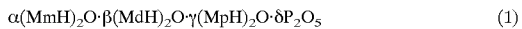

$$\alpha(MmH)_2O \cdot \beta(MdH)_2O \cdot \gamma(MpH)_2O \cdot \delta P_2O_5 \qquad (1)$$

wherein Mm represents melamine, Md represents melam, Mp represents melem, H represents a hydrogen atom, P represents a phosphorus atom, O represents an oxygen atom, and $\alpha$, $\beta$, $\gamma$ and $\delta$ represent positive numbers, having an interrelation of $1 \leq (\alpha+\beta+\gamma)/\delta < 2$, which has a solubility of from 0.01 to 0.10 g/100 ml in water (25° C.), a pH of from 4.0 co 7.0 as a 10 wt % aqueous slurry (25° C.), and a melamine content of from 0.05 to 1.00 mol, a melam content of from 0.30 to 0.60 mol and a melem content of from 0.05 to 0.80 mol, per mol of the phosphorous atom.

2. The melamine.melam.melem salt of a polyphosphoric acid according to claim 1, which has a melamine content of from 0.05 to 0.40 mol, a melam content of from 0.30 to 0.60 mol and a melem content of from 0.30 to 0.80 mol, per mol of the phosphorous atom.

3. A process for producing a melamine melam melem salt of a polyphosphoric acid of the formula (1):

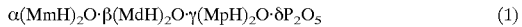

$$\alpha(MmH)_2O \cdot \beta(MdH)_2O \cdot \gamma(MpH)_2O \cdot \delta P_2O_5 \qquad (1)$$

wherein Mm represents melamine, Md represents melam, Mp represents melem, H represents a hydrogen atom, P represents a phosphorus atom, O represents an oxygen atom, and $\alpha$, $\beta$, $\gamma$ and $\delta$ represent positive numbers, having an interrelation of $1 \leq (\alpha+\beta+\gamma)/\delta < 2$, which has a solubility of from 0.01 to 0.10 g/100 ml in water (25° C.), a pH of from 4.0 to 7.0 as a 10 wt % aqueous slurry (25° C.), and a melamine content of from 0.05 to 1.00 mol, a melam content of from 0.30 to 0.60 mol and a melem content of from 0.05 to 0.80 mol, per mol of the phosphorous atom, which process comprises the following steps (a) and (b):

(a) a step of obtaining a reaction product by mixing melamine and aqueous phosphoric acid at a temperature of from 0 to 330° C. in such a ratio that the melamine is from 2.0 to 4.0 mols per mol of the phosphoric acid (as calculated as orthophosphoric acid content), and (b) a step of baking the reaction product obtained in step (a) at a temperature of from 340 to 450° C. for from 0.1 to 30 hours.

4. The process for producing a melamine.melam.melem salt of a polyphosphoric acid according to claim 3, wherein in step (a), the aqueous phosphoric acid is an aqueous orthophosphoric acid solution having an orthophosphoric acid concentration of at least 50 wt %.

5. The process for producing a melamine.melam.melem salt of a polyphosphoric acid according to claim 3, wherein in step (a), the mixing is carried out at a temperature of from 80 to 150° C.

6. A process of producing a melamine.melam.melamen salt of a polyphosphoric acid of the formula (1):

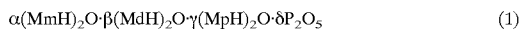
$$\alpha(MmH)_2O \cdot \beta(MdH)_2O \cdot \gamma(MpH)_2O \cdot \delta P_2O_5 \qquad (1)$$

wherein Mm represents melamine, Md represents melam, Mp represents melem, H represents a hydrogen atom, P represents a phosphorus atom, O represents an oxygen atom, and $\alpha$, $\beta$, $\gamma$ and $\delta$ represent positive numbers, having an interrelation of $1 \leq (\alpha+\beta+\gamma)/\delta < 2$, which has a solubility of from 0.01 to 0.10 g/l 100 ml in water (25° C.), a pH of from 4.0 to 7.0 as a 10 wt % aqueous slurry (25° C.), and a melamine content from 0.05 to 0.40 mol, a melan content of from 0.30 to 0.60 mol and a melam content of from 0.30 to 0.80 mol, per mol of the phosphorous atom, which process comprises the following steps (a) and (b):

(a) a step of obtaining a reaction product by mixing melamine and aqueous phosphoric acid at a temperature of from 0 to 330° C. in such a ratio that the melamine is from 2.0 to 4.0 mols per mol of the phosphoric acid (as calculated as orthophosphoric acid content), and (b) a step of baking the reaction product obtained in step (a) at a temperature of from 340 to 450° C. for from 0.1 to 30 hours, while returning a sublimate of melamine to the system, and discharging formed ammonia out of the system.

7. The process for producing a melamine.melam.melem salt of a polyphosphoric acid according to claim 6, wherein in step (a), the aqueous phosphoric acid is an aqueous orthophosphoric acid solution having an orthophosphoric acid concentration of at least 50 wt %.

8. The process for producing a melamine.melam.melem salt of a polyphosphoric acid according to claim 6, wherein in step (a), the mixing is carried out at a temperature of from 80 to 150° C.

9. A melamine.melam.melem salt of a polyphosphoric acid which has a solubility of from 0.01 to 0.10 g/100 ml in water (25° C.), a pH of from 4.0 to 7.0 as a 10 wt % aqueous slurry (25° C.), and a melamine content of from 0.05 to 1.00 mol, a melam content of from 0.30 to 0.60 mol and a melem content of from 0.05 to 0.80 mol, per mol of the phosphorous atom, prepared by a process which comprises the following steps (a) and (b):

(a) a step of obtaining a reaction product by mixing melamine and aqueous phosphoric acid at a temperature of from 0 to 330° C. in such a ratio that the melamine is from 2.0 to 4.0 mols per mol of the phosphoric acid (as calculated as orthophosphoric acid content), and (b) a step of baking the reaction product obtained in step (a) at a temperature of from 340 to 450° C. for from 0.1 to 30 hours.

10. The melamine.melam.melem salt of a polyphosphoric acid prepared by the process according to claim 9, wherein in step (a), the aqueous phosphoric acid is an aqueous orthophosphoric acid solution having an orthophosphoric acid concentration of at least 50 wt %.

11. The melamine.melam.melem salt of a polyphosphoric acid prepared by the process according to claim 9, wherein in step (a), the mixing is carried out at a temperature of from 80 to 150° C.

12. The melamine.melam.melem salt of a polyphosphoric acid which has a solubility of from 0.01 to 0.10 g/100 ml in water (25° C.), a pH of from 4.0 to 7.0 as a 10 wt % aqueous slurry (25 ° C.), and a melamine content from 0.05 to 0.40 mol, a melan content of from 0.30 to 0.60 mol and a melam content of from 0.30 to 0.80 mol, per mol of the phosphorous atom, prepared by a process which comprises the following steps (a) and (b):

(a) a step of obtaining a reaction product by mixing melamine and aqueous phosphoric acid at a temperature of from 0 to 330° C. in such a ratio that the melamine is from 2.0 to 4.0 mols per mol of the phosphoric acid (as calculated as orthophosphoric acid content), and (b) a step of baking the reaction product obtained in step (a) at a temperature of from 340 to 450° C. for from 0.1 to 30 hours, while returning a sublimate of melamine to the system, and discharging formed ammonia out of the system.

13. The melamine.melam.melem salt of a polyphosphoric acid prepared by the process according to claim 12, wherein in step (a), the phosphoric acid is an aqueous orthophosphoric acid solution having an orthophosphoric acid concentration of at least 50 wt %.

14. The melamine.melam.melem salt of a polyphosphoric acid prepared by the process according to claim 12, wherein in step (a), the mixing is carried out at a temperature of from 80 to 150° C.

* * * * *